(12) United States Patent
Fang et al.

(10) Patent No.: US 6,762,886 B1
(45) Date of Patent: Jul. 13, 2004

(54) 10X ZOOM RATIO WIDE-ANGLE ZOOM LENS

(75) Inventors: Yi-Chin Fang, Hsinchu Hsien (TW); Chao-Hsien Chen, Hsinchu Hsien (TW); Chen-Chin Cheng, Hsinchu Hsien (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 0 days.

(21) Appl. No.: 10/459,422
(22) Filed: Jun. 12, 2003

(30) Foreign Application Priority Data

Mar. 11, 2003 (TW) .......................................... 92105267 A

(51) Int. Cl.[7] .............................................. G02B 15/14
(52) U.S. Cl. ...................................... 359/687; 359/684
(58) Field of Search ................................ 359/687, 684, 359/683, 676, 708, 713–715

(56) References Cited

U.S. PATENT DOCUMENTS 6,128,140 A * 10/2000 Yoneyama .................. 359/687
6,483,648 B1 * 11/2002 Yamanashi .................. 359/683
6,587,280 B2 * 7/2003 Horiuchi ..................... 359/684

* cited by examiner

Primary Examiner—Jordan M. Schwartz
(74) Attorney, Agent, or Firm—Birch, Stewart, Kolasch & Birch, LLP

(57) ABSTRACT

A 10× ratio wide-angle zoom lens includes several lens sets which is made of several lenses with different focal lengths. It has a first lens set with a positive dioptre, a second lens set with a negative dioptre, a third lens set with a positive dioptre, and a fourth lens set with a positive dioptre. The second lens set further contains two lenses with negative dioptres and one lens with a positive dioptre. The lens with a positive dioptre has a non-spherical surface on the object side. The lens with a negative dioptre closer to the lens with a positive dioptre is cemented to the positive-dioptre lens. The fourth lens set contains a lens with a negative dioptre and two non-spherical surfaces. The wide-angle zoom lens moves the second and the fourth lens set along its optical axis to adjust its zoom and moves the fourth lens set to focus.

8 Claims, 7 Drawing Sheets

10X ZOOM RATIO WIDE-ANGLE ZOOM LENS

BACKGROUND OF THE INVENTION

1. Field of Invention

The invention relates to a zoom lens and, in particular, to a wide-angle (greater than 70 degrees) zoom lens for digital cameras that can reach more than 10× zoom ratio.

2. Related Art

In recent years, we observe the trend of compact and light lenses on many digital image capture devices, such as digital cameras and digital video camcorder(DVC's). The advantages of these lenses attribute to the minimization of the length of the lens set, the front lens element and the simplification of the lens set.

To achieve the above objective, the focus mechanism is moved from the conventional front element or the first element to the least lens sets. This introduces the so-called back-element focusing. The back-element focusing design is superior to those in the prior art. The size of the first clement is greatly reduced for the convenience of minimization of lenses. This enables the ultra-short focusing for macro lenses. Because of the minimization of the lens, the driving force to push the lens by the image capture device is reduced. Moreover, the focusing can be quickly achieved using the current driving mechanism.

On the other hand, aberrations occurred to the back-element focusing system are not easy to control, resulting in difficult control of the image quality. Increasing the zooming range also deteriorates the image quality. Restricted by these limits, the image quality obtained using the lenses in the prior art cannot be improved. The effect of accessory wide-angle lenses on cameras is very limited and may have large distortions. They are also very inconvenient for the users to carry.

The most important issue is the optical design restriction. Compactness and lightness are never achieved in the DVC's. The usual viewing angle is about 60 degrees. We do not find any patent or literature that addresses the question of having a viewing effect with angles wider than 64 degrees.

SUMMARY OF THE INVENTION

In view of the foregoing, the invention discloses a 10× zoom ratio wide-angle zoom lens. A primary objective of it is to achieve both wide angles (up to 70 degrees) and a 10× zoom ratio magnification power under the premises of keeping good image quality and satisfying the requirements of compactness and lightness. The invention contains a first lens set with a positive dioptre, a second lens set with a negative dioptre, a third lens set with a positive dioptre and a fourth lens set with a positive dioptre. The second lens set further contains two lenses with negative dioptres and one lens with a positive dioptre. The lens with a positive dioptre has a non-spherical surface on the object side. The lens with a negative dioptre closer to the lens with a positive dioptre is cemented to the positive-dioptre lens. The fourth lens set contains a lens with a negative dioptre and two non-spherical surfaces. The wide-angle zoom lens moves the second lens set and the fourth lens set along its optical axis to adjust its zoom and moves the fourth lens set to focus.

The invention has the design concept of compactness and lightness. Along with the non-spherical lens technology, a wide-angle optical design is achieved and suitable for current market demands.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The invention discloses a 10× zoom ratio wide-angle zoom lens.

Figure 1:
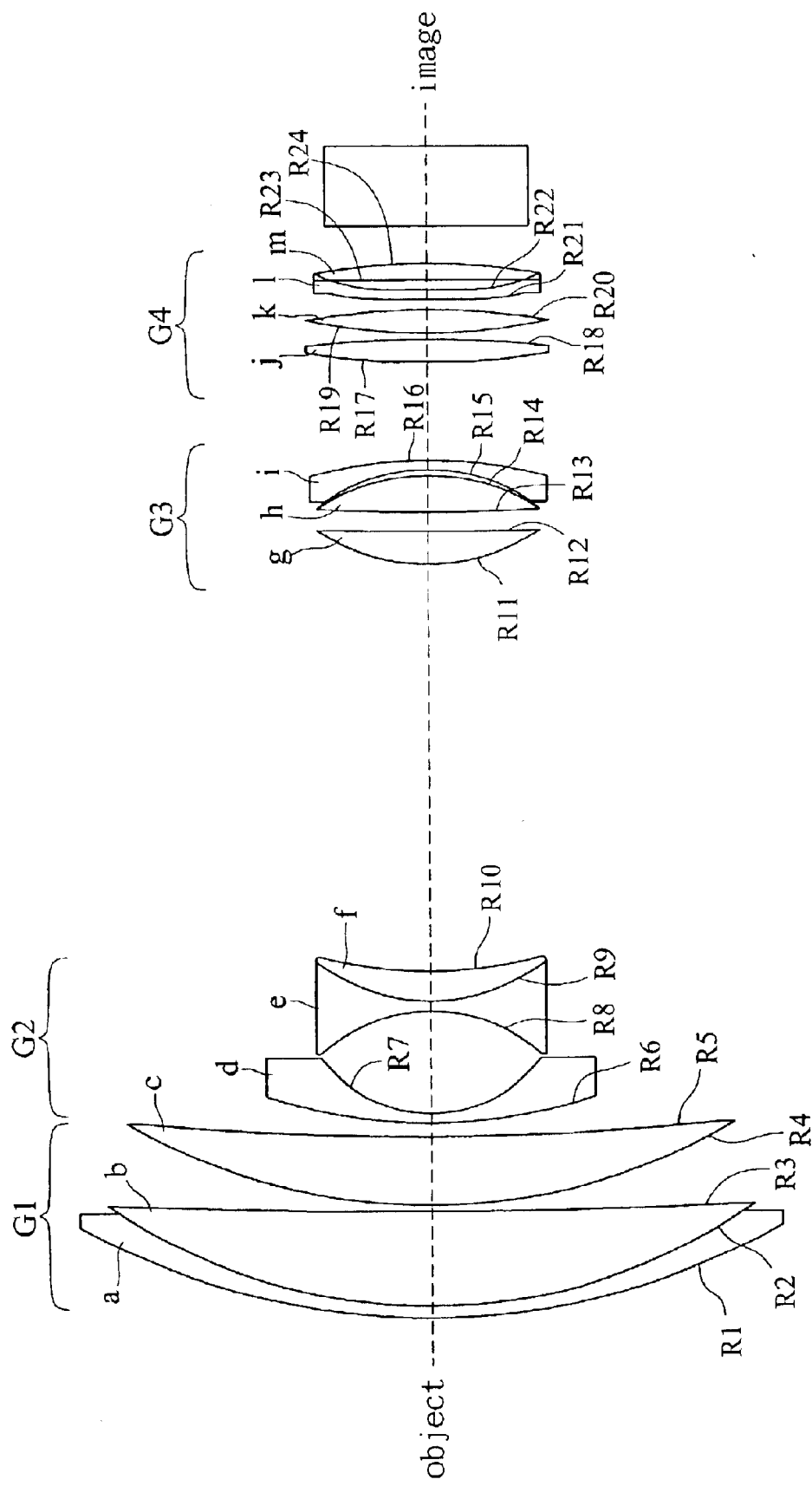
FIG. 1 shows a schematic structure of the disclosed 10× zoom ratio wide-angle zoom lens.
Figure 2:
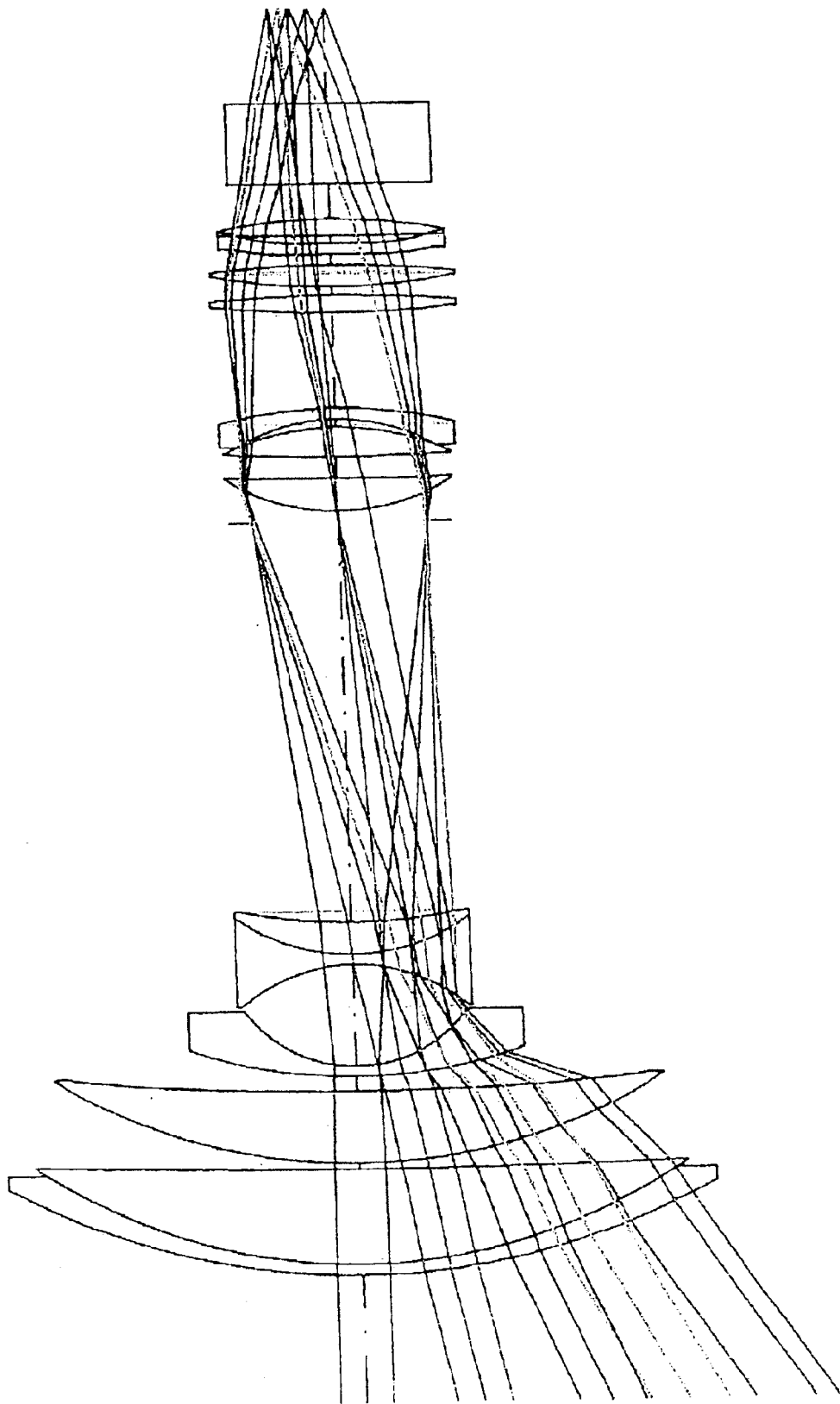
FIG. 2 shows a schematic structure of a wide angle embodiment (f=4.4 mm) according to the invention.
Figure 3:
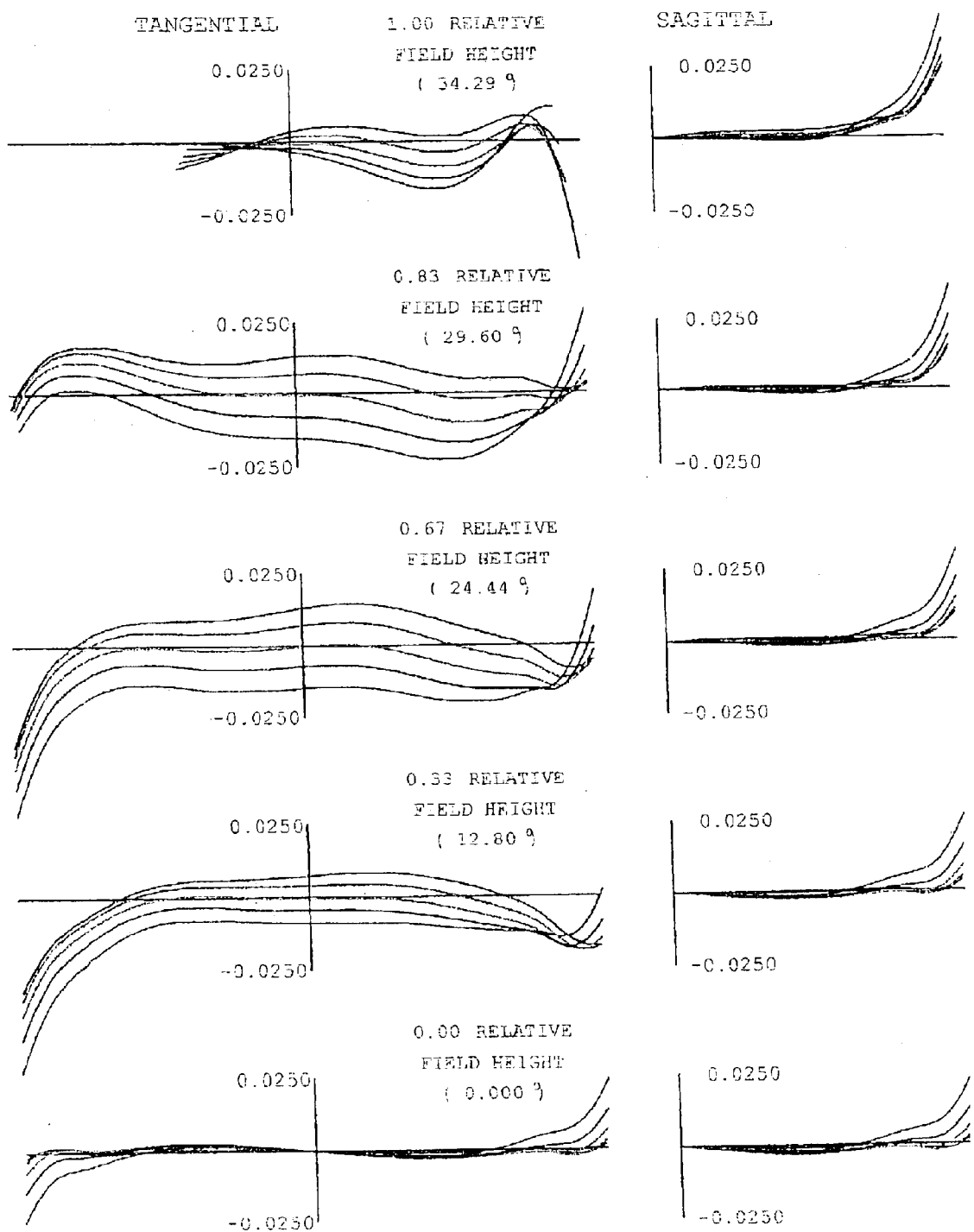
FIG. 3 shows the optical behavior of a wide angle embodiment (f=15 mm) according to the invention.
Figure 4:
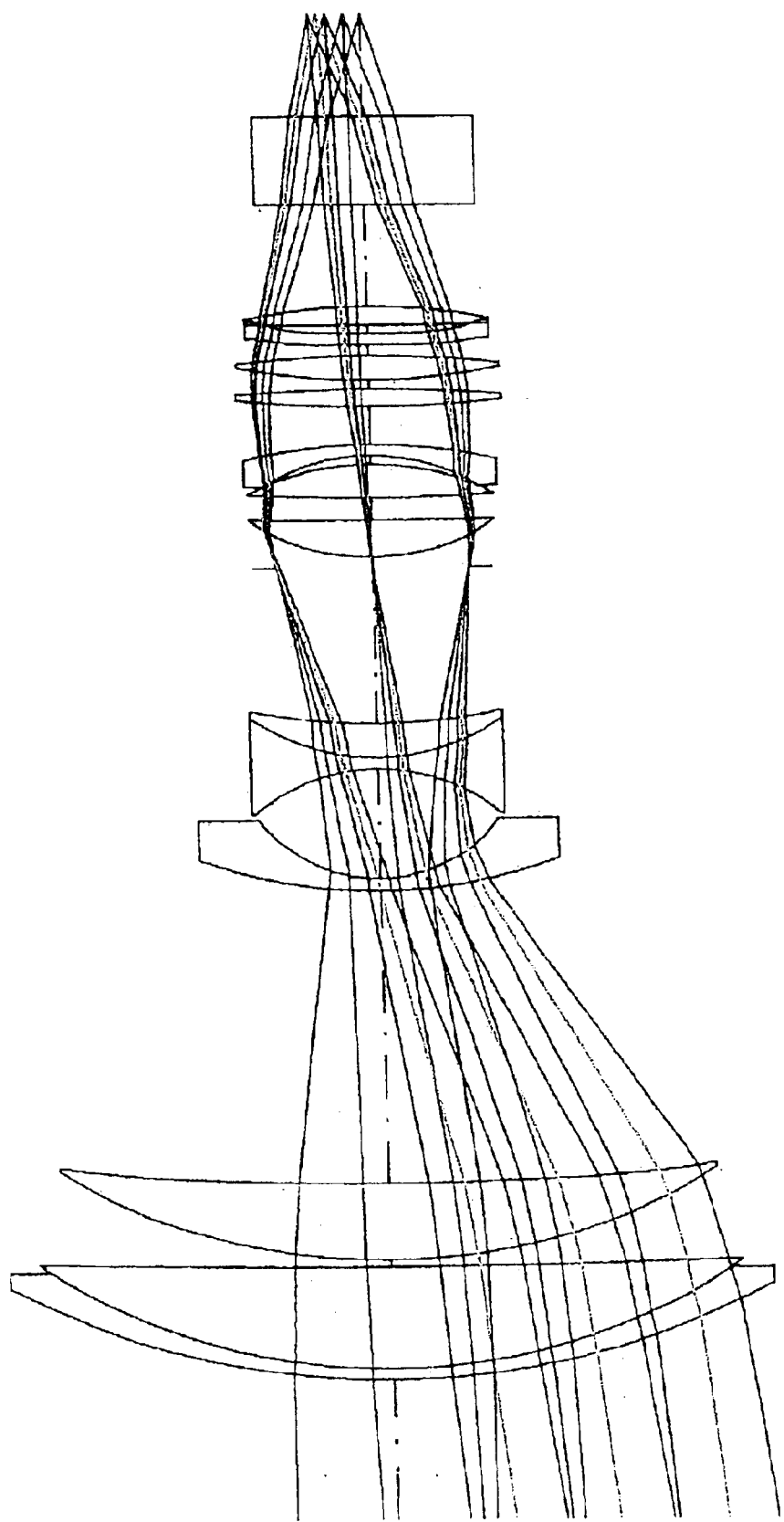
FIG. 4 shows a schematic structure of a middle angle embodiment (f=15 mm) according to the invention.
Figure 5:
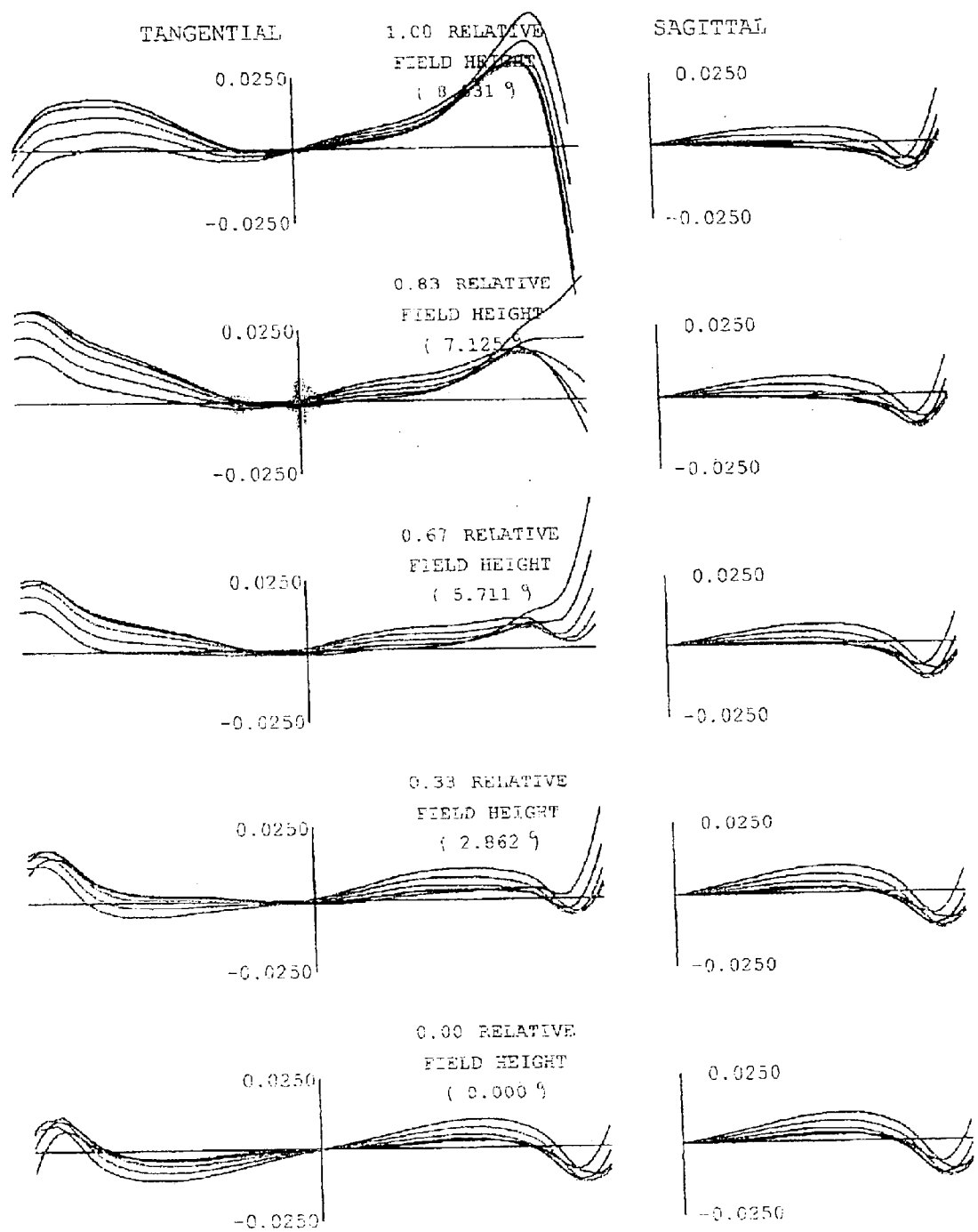
FIG. 5 shows the optical behavior of a middle angle embodiment (f=4.4 mm) according to the invention.
Figure 6:
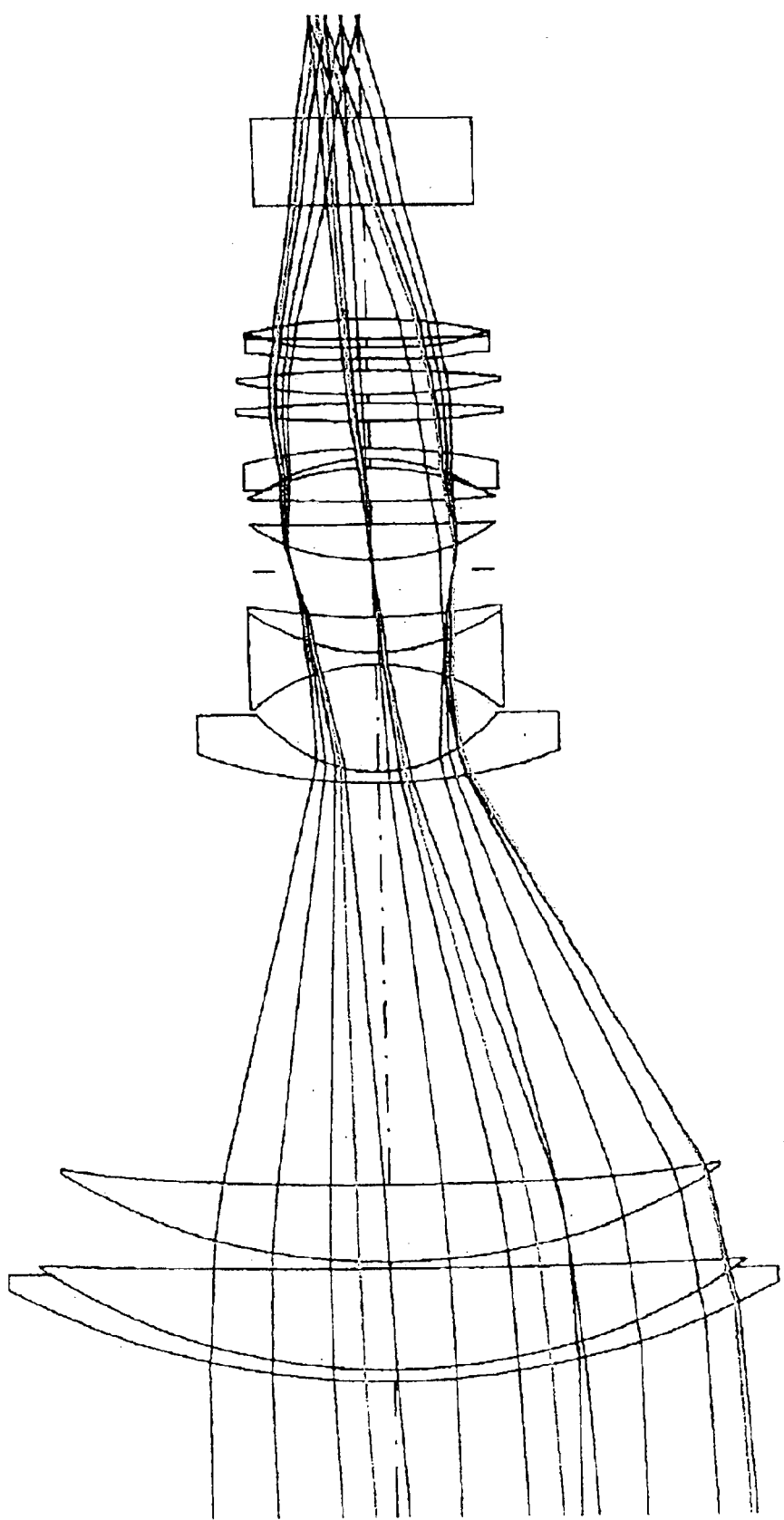
FIG. 6 shows a schematic structure of a tele angle embodiment (f=46 mm) according to the invention.
Figure 7:
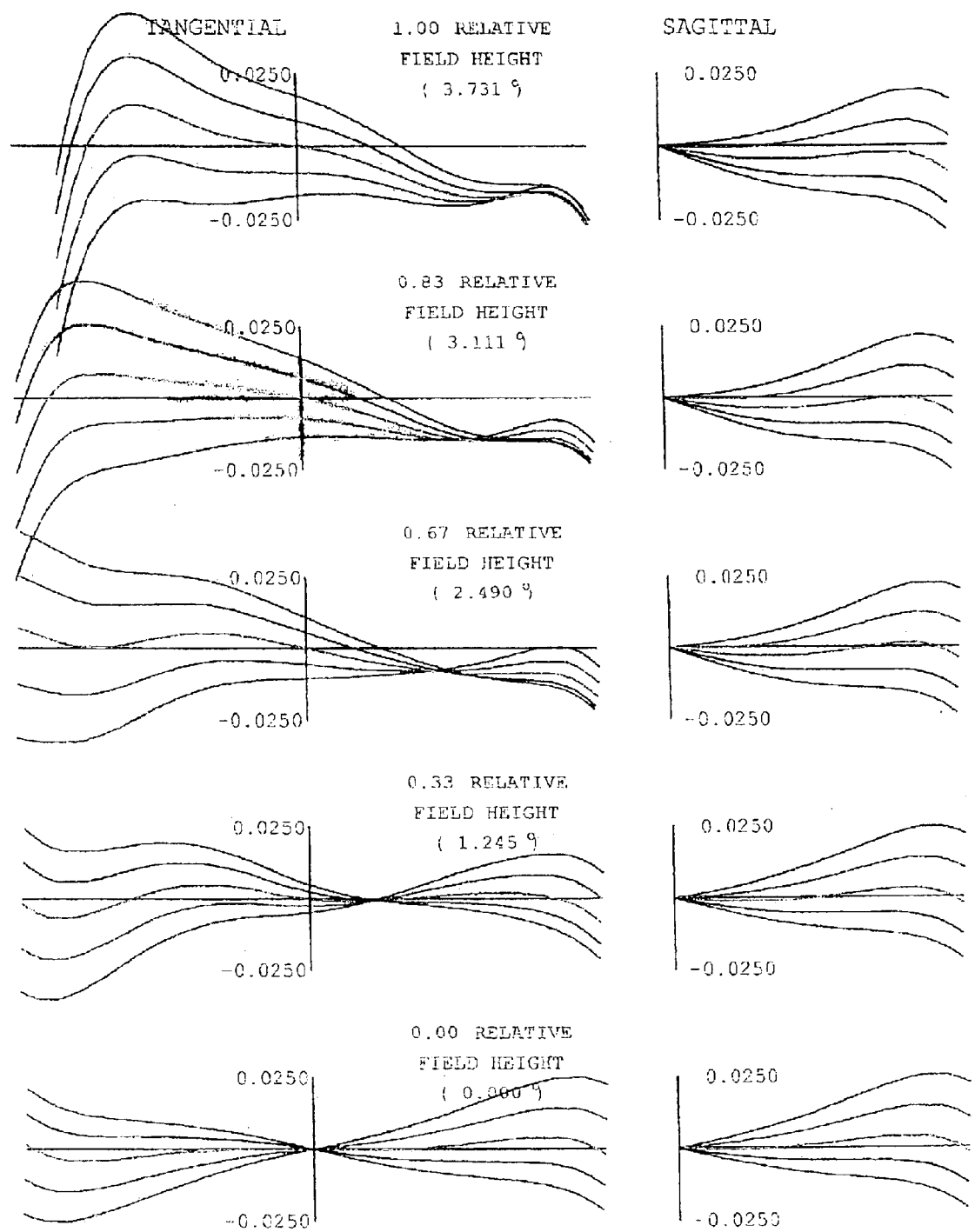
FIG. 7 shows the optical behavior of a tele angle embodiment (f=46 mm) according to the invention.

With reference to FIG. 1, the disclosed 10× zoom ratio wide-angle zoom lens consists of several lens sets between the object and the image. Each lens set contains several lenses with different focal lengths. In particular, the first lens set G1 has a positive dioptre, the second lens G2 set has a negative dioptre, the third lens set G3 has a positive dioptre, and the fourth lens set G4 has a positive dioptre too. The second lens set G2 contains two negative-dioptre lenses d, e and a positive-dioptre lens f. The surface of the positive-dioptre lens f on the object side is non-spherical (the non-spherical coefficient is between −0.2 and −0.4). Each of the negative-dioptre lenses d, e has one side cemented to the positive-dioptre lens f. The refraction index of the negative-dioptre lens d on the object side is between 1.88 and 1.92. The curvature radius ratio $R_6/R_7$ is between 4 and 5, where $R_6$ and $R_7$ and the curvature radii of the surfaces of the negative-dioptre lens close to and far from the object, respectively. The absolute value of the curvature radius ratio $R_8/R_9$ of the negative-dioptre lens on the image side is between 0.9 and 1.1, with a refraction index between 1.4 and 1.5. The curvature radius ratio $R_{10}/R_9$ of the positive-dioptre lens is between 3 and 4, with a refraction index between 1.83 and 1.85, where $R_{10}$ and $R_9$ are the curvature radii of the surfaces of the positive-dioptre lens close to and far from the image, respectively. The fourth lens set G4 contains a negative-dioptre lens 1 with both surfaces non-spherical. The curvature radius ratio $R_{17}/R_{18}$ of the first positive-dioptre lens j is between 1.0 and 1.6, with a refraction index between 1.75 and 1.80. The curvature radius ratio $R_{19}/R_{20}$ of the second positive-dioptre lens k is between 2 and 3, with a refraction index between 1.6 and 1.7. The two curvature radii of the negative-dioptre lens 1 are both negative. Its curvature radius ratio $R_{21}/R_{22}$ of is between 1.1 and 1.2, and its refraction index is between 1.8 and 1.9. The non-spherical coefficients of $R_{21}$ and $R_{22}$ are, respectively, between −1000 and −1500 and between −1000000 and −100000000. The curvature radius ratio $R_{23}/R_{24}$ of the third positive-dioptre lens m is between 10 and 12, with a refraction index between 1.6 and 1.7. The wide-angle zoom lens moves the second lens set and the fourth lens set along its optical axis to adjust its zoom and moves the fourth lens set to focus.

Please refer to FIG. 2 through 7 for the schematic views of the embodiments and their optical behaviors of the invention.

Certain variations would be apparent to those skilled in the art, which variations are considered within the spirit and scope of the claimed invention.

What is claimed is:

1. A 10× zoom ratio wide-angle zoom lens comprising a plurality of lens sets containing a plurality of lenses with different focal lengths between an object and an image, the zoom lens comprise of:

a first lens set with a positive dioptre;

a second lens set with a negative dioptre, which contains:
two negative-dioptre lenses; and
a positive-dioptre lens, whose surface close to the object is non-spherical and has a non-spherical coefficient between −0.2 and −0.4;
wherein the negative-dioptre lens close to the positive-dioptre lens is cemented to the positive-dioptre lens;

a third lens set with a positive dioptre; and a fourth lens set with a positive dioptre, which contains a negative-dioptre lens that has two non-spherical surfaces with non-spherical coefficients between −1000 and −1500 and between −1000000 and −100000000, respectively;

wherein a light beam from the object passes in order the first lens set, the second lens set, the third lens set, and the fourth lens set and forms the image, and the second lens set and the fourth lens set are adjusted for zooming and the fourth lens set is moved to focus.

2. The 10× zoom ratio wide-angle zoom lens of claim 1, where in the positive-dioptre lens in the second lens set is closer to the image than one of the negative-dioptre lens.

3. The 10× zoom ratio wide-angle zoom lens of claim 1, where in the refraction index of the negative-dioptre on the object side lens in the second lens set is between 1.88 and 1.92, the curvature radius ratio $R_6/R_7$ is between 4 and 5, where $R_6$ and $R_7$ are the curvature radii of the surfaces of the negative-dioptre lens close to and far from the object, respectively, the absolute value of the curvature radius ratio $R_8/R_9$ of the negative-dioptre lens on the image side is between 0.9 and 1.1, with a refraction index between 1.4 and 1.5, where $R_8$ and $R_9$ are the surfaces of the negative-dioptre lens close to and far from the object, respectively, and the curvature radius ratio $R_{10}/R_9$ of the positive-dioptre lens is between 3 and 4, with an refraction index between 1.83 and 1.85, where $R_{10}$ and $R_9$ are the curvature radii of the surfaces of the positive-dioptre lens close to and far from the image, respectively.

4. The 10× zoom ratio wide-angle zoom lens of claim 1, where in the second lens set contains from the object side to the image side a first negative-dioptre lens, a second negative-dioptre lens, and a positive-dioptre lens.

5. The 10× zoom ratio wide-angle zoom lens of claim 1, where in the fourth lens set contains a negative-dioptre lens and three positive-dioptre lenses.

6. The 10× zoom ratio wide-angle zoom lens of claim 5, where in one of the positive-dioptre lenses in the fourth lens set is closer to the image than the negative-dioptre lens.

7. The 10× zoom ratio wide-angle zoom lens of claim 1, where in the fourth lens set contains from the object side to the image side a first positive-dioptre lens, a second positive-dioptre lens, a negative-dioptre lens, and a third positive-dioptre lens.

8. The 10× zoom ratio wide-angle zoom lens of claim 7, where in the curvature radius ratio $R_{17}/R_{18}$ of the first positive-dioptre lens j is between 1.0 and 1.6, with a refraction index between 1.75 and 1.80, where $R_{17}$ and $R_{18}$ are surfaces of the first positive-dioptre lens close to and far from the object, respectively, the curvature radius ratio $R_{19}/R_{20}$ of the second positive-dioptre lens k is between 2 and 3, with a refraction index between 1.6 and 1.7, where $R_{19}$ and $R_{20}$ are surfaces of the second positive-dioptre lens close to and far from the object, respectively; the two curvature radii of the negative-dioptre lens 1 of the fourth lens set are both negative, with a curvature radius ratio $R_{21}/R_{22}$ between 1.1 and 1.2 and a refraction index between 1.8 and 1.9, where $R_{21}$ and $R_{22}$ are surfaces of the negative-dioptre lens close to and far from the object, respectively, the curvature radius ratio $R_{23}/R_{24}$ of the third positive-dioptre lens m is between 10 and 12, with a refraction index between 1.6 and 1.7, where $R_{23}$ and $R_{24}$ are surfaces of the third positive-dioptre lens close to and far from the object, respectively.

* * * * *